W. H. JOHNSON.
Milk-Cooler.

No. 165,102.

2 Sheets--Sheet 2.

Patented June 29, 1875.

Witnesses.
James Martin
J. N. Campbell

Inventor:
William H. Johnson,
by
Mason, Fenwick & Lawrence

UNITED STATES PATENT OFFICE.

WILLIAM H. JOHNSON, OF DELHI, N. Y., ASSIGNOR OF ONE-HALF HIS RIGHT TO HERBERT A. PITCHER AND FREDERICK A. RAY, OF SAME PLACE.

IMPROVEMENT IN MILK-COOLERS.

Specification forming part of Letters Patent No. 165,102, dated June 29, 1875; application filed May 31, 1875.

*To all whom it may concern:*

Be it known that I, WILLIAM H. JOHNSON, of Delhi, county of Delaware and State of New York, have invented a new and Improved Combined Milk-Pan and Water-Vat; and I do hereby declare the following is a full, clear, and exact description thereof, reference being had to the accompanying drawings, making part of this specification, in which—

Figure 1:
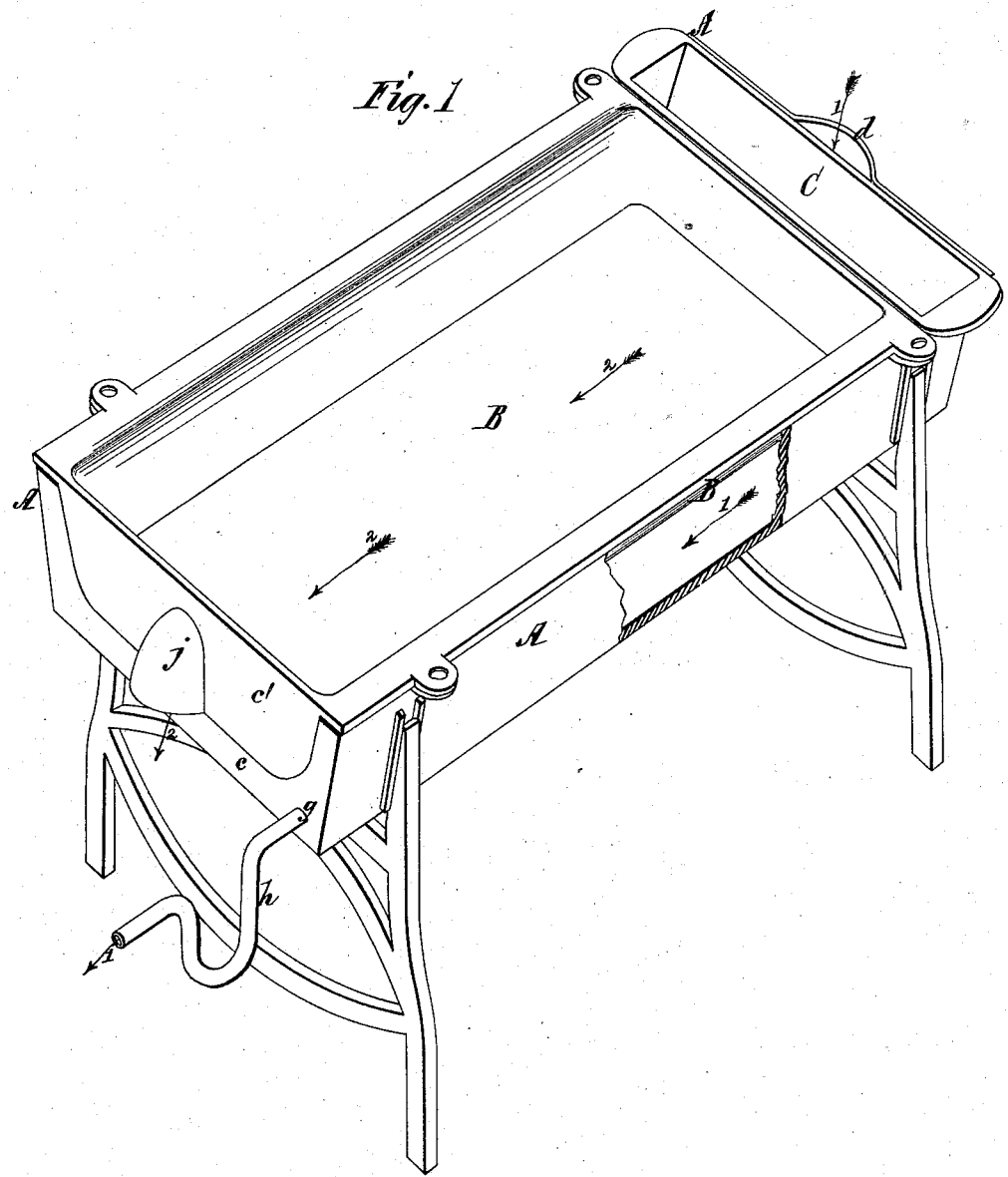
Figure 2:
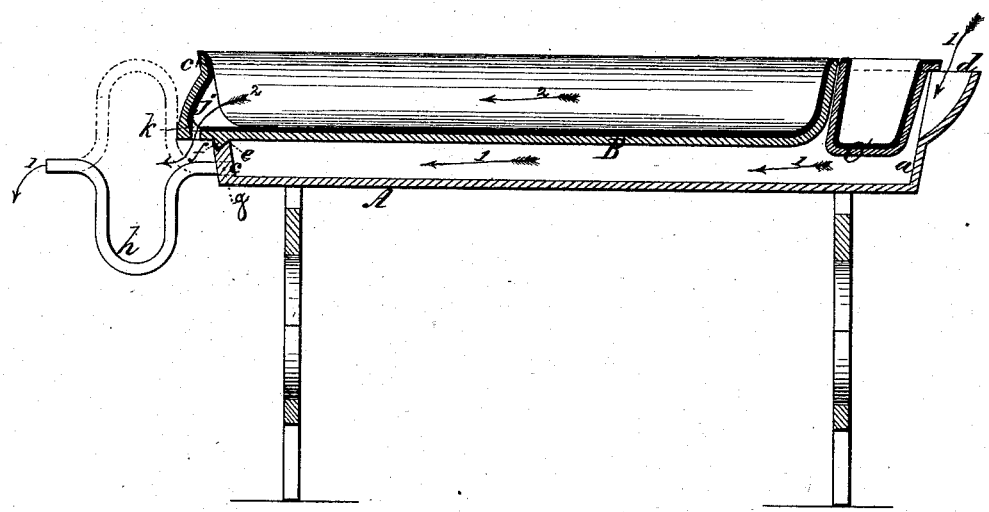
Figure 3:
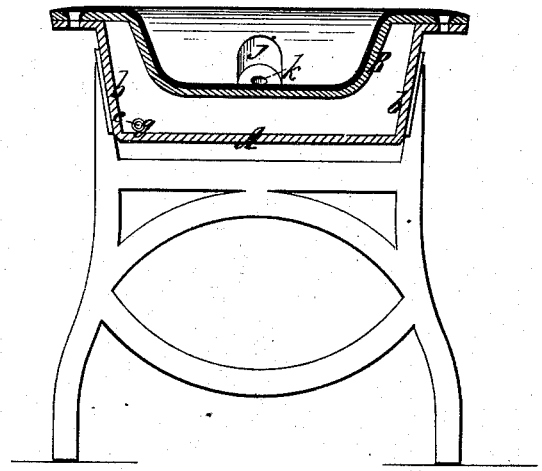

Figure 1 is a perspective view of my improved apparatus. Fig. 2 is a vertical longitudinal, and Fig. 3 a vertical transverse, section of the same.

Similar letters of reference indicate corresponding parts in the several figures.

The nature of my invention consists in certain constructions and combinations of parts, as hereinafter described and specifically claimed, whereby milk and cream can be kept cool without danger of injury to its taste or color, and can be drawn from the pan without passing through a packed pipe extended through the pan and water-vat, and the height of water in the pan can be conveniently regulated, as required.

To enable others skilled in the art to make and use my invention, I will proceed to describe it.

A is a water-vat, mounted in any suitable manner upon legs or a frame. This is made of metal and cast in one piece. The receiving end $a$ and the sides $b$ of this vat are inclined outward from the bottom, and midway of the said end a receiving-mouth or concave extension, $d$, is formed, as plainly shown in Figs. 1 and 2. The discharging end $c$ of the vat is not, for a portion of its length, as high as the receiving end, and is provided with a V or other suitable shaped groove, $e$, for the reception of a strip of packing, and a tongue, $f$, on the bottom of the milk-pan B. Between the top edge of this end $c$ and the bottom of the vat, and on one side of the center, a discharge-passage, $g$, is made in the vat, and in this passage one end of a pipe, $h$, which resembles somewhat the letter U, is inserted and made capable of adjustment, as illustrated by the dotted lines in Fig. 2. The pipe has a screw-thread cut on one of its ends, and a similar screw-thread is tapped in the end of the vat, and by this construction the pipe will be held in place after being adjusted. When the pipe is turned down the pan will be emptied of all of its water, but when the U bend of the pipe is turned up to any degree above the level of the discharge-passage the water will be retained at the same level with the altitude of the U-bend of the pipe, and thus the tempering-water circulating through the vat under the pan can be retained or allowed to flow off, as occasion may require. The pan B is made of cast-iron and coated with porcelain, or it is made of glass, earthenware, or other material which will not impart a bad taste to the milk or cream and discolor the same. The length of the pan is not equal to the length of the vat. Its discharging end $c'$ fills the space left in the discharge end of the vat, and thus the discharging end of the pan forms the major part of the discharging end of the vat. On the outside of this pan, at the margin of its discharging end, a V or other suitable shaped tongue, $f$, is formed, which fits upon the packing placed in the groove $e$ in the edge of the discharging-end portion of the vat. Outside of the end of the pan and vat a hollow extension or lip, $j$, is formed on the pan, and through the bottom of this extension a hole, $k$, is provided for the milk or cream to flow through from the pan. The pan is flanged and so formed that its receiving end and sides are isolated from the bottom and sides of the vat, and thus the water in the vat can come in contact with its sides and bottom, and an ice or cream box, C, can be placed against its receiving end. The ice or cream box C is made of metal coated with porcelain and flanged so as to be exposed on all sides to the water flowing through the vat. It may be made of glass or other material which will not impart a bad taste or color to the cream or ice-water in the box.

It will be observed that I have but one joint to pack, and that the inconvenience of having pipes and cocks and packed joints under the vat is avoided by my construction.

The arrows No. 1 show the course of the tempering-water from the mouth $d'$ to and through the discharge-pipe $h$, and the arrows No. 2 show the course of the milk or cream from the pan to and through the discharge-passage $k$.

What I claim is—

1. The milk-pan and the water-vat combined, the discharging end of the pan forming the major part of the discharging end of the vat, and fitted by a tight joint upon the end portion of the vat, and the pan having its discharge-passage outside of the vat, above the bottom of the same, substantially as described.

2. The combination of the flanged ice or cream box, the water-vat and the milk-pan, all constructed substantially in the manner shown and described.

3. The combination of the adjustable regulating bent pipe $h$, water-vat A, and milk-pan B, substantially as and for the purpose described.

WILLIAM H. JOHNSON.

Witnesses:
ANDREW BUCKHAM,
CHARLES A. FOOTE.